United States Patent
Park et al.

(10) Patent No.: US 8,175,051 B2
(45) Date of Patent: May 8, 2012

(54) HYBRID SCHEME FOR DL LINK ADAPTATION

(75) Inventors: Sungki Park, Ashburn, VA (US); Durga Prasad Satapathy, Ashburn, VA (US); Walter Rausch, Shawnee, KS (US)

(73) Assignee: Clearwire IP Holdings LLC, Bellevue, WA (US)

( * ) Notice: Subject to any disclaimer, the term of this patent is extended or adjusted under 35 U.S.C. 154(b) by 427 days.

(21) Appl. No.: 12/474,872

(22) Filed: May 29, 2009

(65) Prior Publication Data

US 2010/0303025 A1  Dec. 2, 2010

(51) Int. Cl.
  *H04W 4/00* (2009.01)
(52) U.S. Cl. ............ 370/329; 455/403; 455/422.1; 455/450
(58) Field of Classification Search ............ 370/310, 370/328, 329; 455/422.1–460
  See application file for complete search history.

(56) References Cited

U.S. PATENT DOCUMENTS

| | | | |
|---|---|---|---|
| 5,577,087 A | 11/1996 | Furuya | |
| 6,865,233 B1 | 3/2005 | Eriksson et al. | |
| 7,164,890 B2 | 1/2007 | Eriksson et al. | |
| 7,342,901 B1 | 3/2008 | Zhang et al. | |
| 7,697,654 B1 * | 4/2010 | Jin et al. | 375/377 |
| 2006/0034229 A1 | 2/2006 | Joo et al. | |
| 2006/0165008 A1 * | 7/2006 | Li et al. | 370/252 |
| 2006/0203712 A1 | 9/2006 | Lim et al. | |
| 2006/0268976 A1 | 11/2006 | Baum et al. | |
| 2007/0026881 A1 | 2/2007 | Tzavidas et al. | |
| 2007/0189211 A1 | 8/2007 | Awad et al. | |
| 2007/0258407 A1 | 11/2007 | Li et al. | |
| 2008/0137562 A1 | 6/2008 | Li et al. | |
| 2008/0144570 A1 | 6/2008 | Hwu et al. | |
| 2008/0219376 A1 | 9/2008 | Qi et al. | |
| 2010/0120464 A1 * | 5/2010 | Bjorken et al. | 455/522 |

OTHER PUBLICATIONS

International Search Report and Written Opinion for PCT/US2010/034458 mailed Jul. 15, 2010, 12 pages.
International Search Report and Written Opinion for PCT/US2010/038395 mailed Aug. 11, 2010, 10 pages.

* cited by examiner

*Primary Examiner* — Hassan Kizou
*Assistant Examiner* — Charles C Jiang
(74) *Attorney, Agent, or Firm* — Pillsbury Winthrop Shaw Pittman LLP

(57) ABSTRACT

A system and method of a hybrid scheme of DL link adaptation in a network having mobile stations (MSs) in communication with a base station (BS). The system may include a mode decision module associated with the base station. The mode decision module may include one or more processors configured to select a first mode configuration for use during transmission of a first communication from the base station. The BS may receive first feedback information associated with the first communication, where the first feedback information includes a first mode recommendation and first channel information. Based on the first feedback information, the BS may generate a BS-derived mode configuration based on the first channel information and compare the first mode recommendation and the BS-derived mode configuration. Based on the comparison, the BS may determine a second mode configuration to use to configure a second communication.

22 Claims, 6 Drawing Sheets

HYBRID SCHEME FOR DL LINK ADAPTATION

CROSS-REFERENCE TO RELATED APPLICATIONS

This application is related to co-pending U.S. patent application Ser. No. 12/488,271 filed on 19 Jun. 2009 and entitled "A solution for INE/HO LB Bottleneck," which is hereby incorporated by reference herein in its entirety.

BACKGROUND

This disclosure relates to a system and method for implementing a hybrid scheme of DL Link adaptation by a Base Station in a Wireless Metropolitan Area Network (WiMAX) described in the IEEE 802.16 specification.

In a WiMAX communications network, a base station (BS) may communicate with a mobile station (MS) on a communication channel. Various factors such as the existence of ambient interference around the MS or BS, movement of the MS, system level performance of the BS, and/or other factors may degrade or otherwise alter the condition of the communication channel. As such, various channel information may be used to indicate the channel condition. There exists a variety of channel information such as, for example, a Physical Carrier to Interference plus Noise Ratio (PCINR), an Effective Carrier to Interference Noise Ratio (ECINR), channel correlation (Corr), Rank, a Received Signal Strength Indicator (RSSI), a Burst Error Rate (BuER) based on an ACK/NACK ratio that indicates a proportion of successful data transmissions to unsuccessful transmission (thereby indicating channel stability), PCINR Standard Deviation that may indicate Doppler and fading effects that result from movement of the MS, system loads, and/or other indicators.

In order to respond to changes to the communication channel, the BS may use different mode configurations. Mode configurations may include, among other things, a Modulation Coding Scheme (MCS) level selection, a Multiple-Input-Multiple-Output (MIMO) mode selection, and/or other mode configurations.

In existing systems, the BS generates a mode configuration that the BS has determined to be suitable. The BS-derived mode configuration may be used in these existing systems irrespective of information available to the MS that may be unavailable to the BS. For example, the BS may use PCINR for Download (DL) link adaptation. However, because PCINR is generated before MIMO decoding by the MS, PCINR may be less accurate than ECINR, which is generated by the MS after MIMO decoding. Thus, the BS may use information for DL link adaptation that may be less accurate than information available to the MS. In other existing systems, the MS may generate a recommended mode configuration that the MS has determined to be suitable. In these existing systems, the MS mode recommendation may be used irrespective of information available to the BS that may be unavailable to the MS. The MS 106 mode recommendation and the BS-derived mode configuration may be different because MS 106 and BS 110 disagree on the channel condition. If such disagreement is sufficiently high, then confidence that either is correct may be reduced. Thus, selecting one or the other may result in a selection of an inappropriate mode configuration because the MS, the BS, or both may be incorrect when determining the channel condition.

Thus, by using either an exclusive BS-centric or exclusive MS-centric approach for DL link adaptation, existing systems may not adequately make an appropriate decision because in some instances the BS may have better information applicable for DL link adaptation than the MS while in other instances the MS may have better information applicable to the mode decision than the BS. Vendors currently widely ignore the MS-derived recommendation because they often believe that the MS recommendation may not be as reliable as the BS recommendation.

These and other drawbacks exist.

SUMMARY

According to various embodiments of this disclosure, a system and method may be used to implement a hybrid scheme for DL link adaptation by a Base Station (BS) in a Wireless Metropolitan Area Network (WiMAX) described in the IEEE 802.16 specification. The BS may perform a hybrid scheme of DL link adaptation by selecting a mode configuration for use during communications with a MS. Mode configurations include, for example, Modulation Coding Scheme (MCS) and/or MIMO Mode. In particular, the BS may select various MCS levels that may include, for example, various quadrature phase-shift keying (QPSK) and Quadrature Amplitude Modulation (QAM) schemes. The BS may determine a mode configuration for DL link adaptation by selecting among a BS-derived mode configuration determined by the BS, a MS mode recommendation generated by the MS, and a tuned mode configuration that is generated by the BS using both the BS-derived mode configuration and the MS mode recommendation.

The BS-derived mode configuration may be determined using channel information such as, for example, PCINR, which may be generated by the MS prior to MIMO decoding by the MS. The MS mode configuration recommendation may be based on, for example, ECINR, which may be generated by the MS after MIMO encoding and therefore more accurately measure the channel condition than PCINR. Thus, because the BS and the MS use different information when making a mode configuration recommendation, they may not be in agreement. However, because it may be unclear whether PCINR is more accurate than ECINR (and vice versa), for example, it may be unclear whether the BS or MS mode configuration determination should be used. Thus, the BS may tune the BS-derived mode configuration and the MS mode recommendation in order to determine a tuned mode configuration for DL link adaptation. The BS may use the tuned mode configuration when there exists a predefined level of disagreement among the BS-derived mode and the MS mode recommendation.

By doing so, the system and method may be used to employ a hybrid scheme for DL link adaptation by taking advantage of the benefits of using a BS-derived mode, the benefits of using a MS mode recommendation, and the benefits using a tuned mode configuration that uses the BS-derived mode and the MS mode recommendation.

Various other features and characteristics of the system and method of this disclosure will be apparent through the detailed description of various embodiments and the drawings attached hereto. It is also to be understood that both the foregoing general description and the following detailed description are examples and not restrictive of the scope of the inventive concepts described herein.

DETAILED DESCRIPTION

According to various embodiments of this disclosure, a system and method may be used to implement a hybrid scheme for DL link adaptation by a Base Station (BS) in a Wireless Metropolitan Area Network (WiMAX) described in the IEEE 802.16 specification. The BS may perform DL link adaptation by adaptively selecting a mode configuration for use during communications with a MS. Mode configurations may include, for example, Modulation Coding Scheme (MCS) and/or MIMO Mode. The BS may determine a mode configuration for DL link adaptation by selecting among a BS-derived mode configuration determined by the BS, a MS-derived mode configuration recommended by the MS, and a tuned mode configuration that is generated by using both the BS-derived mode configuration and the MS mode configuration recommendation.

The BS-derived mode configuration may be determined using channel information such as, for example, PCINR, which may be generated by the MS prior to MIMO encoding. The MS mode configuration recommendation may be based on, for example, ECINR, which may be generated by the MS after MIMO encoding and therefore may be a more accurate measure of channel condition than PCINR. Thus, because the BS and the MS may use different information when making a mode configuration recommendation, they may not be in agreement. However, because it may be unclear whether PCINR is more accurate than ECINR (and vice versa), for example, it may be unclear whether the BS or MS mode configuration determination should be used. Thus, the BS may tune the BS-derived mode configuration and the MS recommended mode configuration in order to determine a tuned mode configuration for DL link adaptation. The BS may use the tuned mode configuration when there is a predefined level of disagreement between the BS-derived mode and the MS mode recommendation.

By doing so, the system and method may be used to employ a hybrid scheme for DL link adaptation by taking advantage of the benefits of using a BS-derived mode, the benefits of using a MS mode recommendation, and the benefits using a tuned mode configuration that uses the BS-derived mode and the MS mode recommendation.

Figure 1:
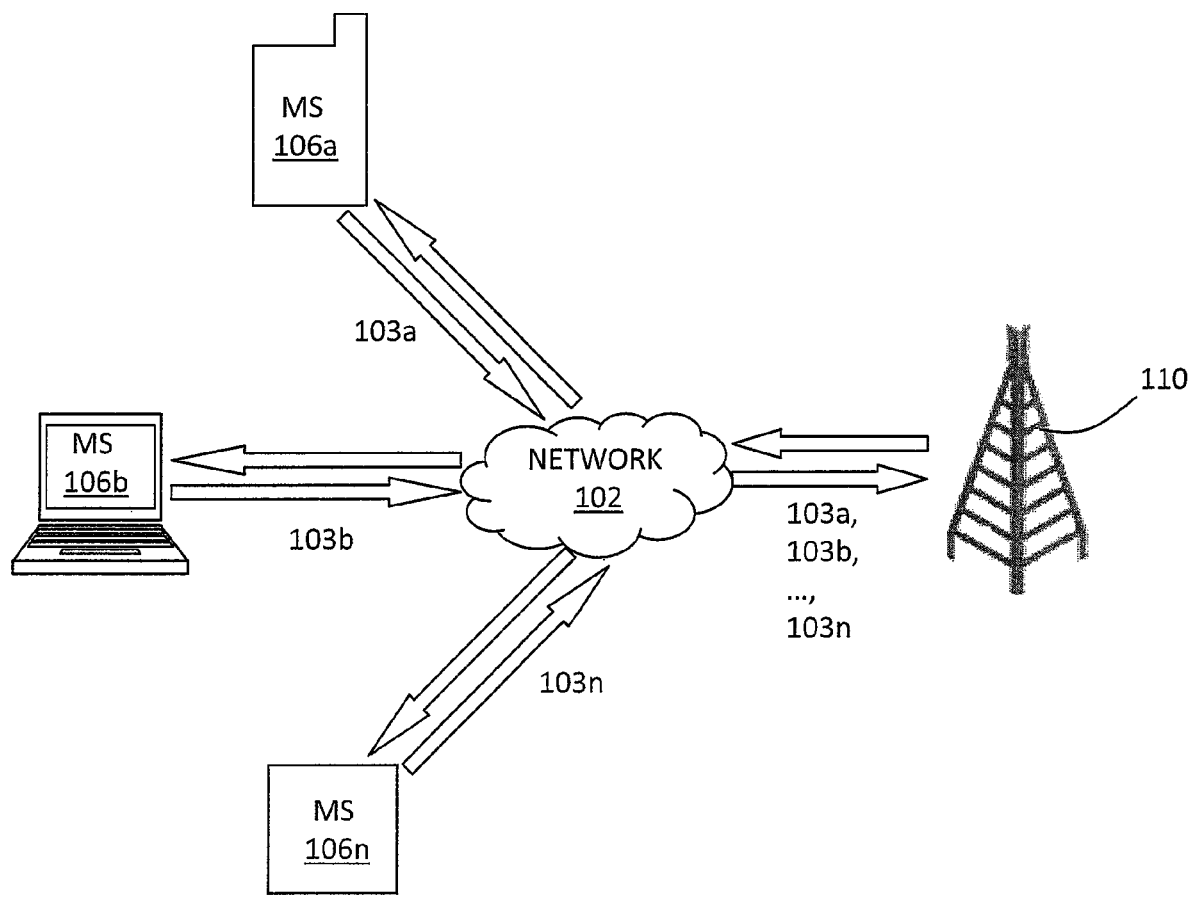
FIG. 1 is a block diagram that illustrates an example of a system of a hybrid scheme for DL link adaptation according to an embodiment of the disclosure.

FIG. 1 is a block diagram that illustrates an example of a system 100 of a hybrid scheme for DL link adaptation according to an embodiment of the disclosure. System 100 may include, among other things, BS 110 communicably coupled on respective communication channels (not shown) to MS 106a, MS 106b, . . . , MS 106n (hereinafter "MS 106" for convenience) via network 102. BS 110 may transmit an initial communication to MS 106 using an initial mode configuration (not shown). MS 106 may receive the initial communication and provide BS 110 with channel condition information that indicates the condition of the communication channel. BS 110 may perform DL link adaptation for subsequent communications with MS 106 by determining an appropriate mode configuration based at least in part on the channel information. The mode configuration may include, among other things, a MCS level, a MIMO mode, MIMO mode feedback interval, and/or other configurations as appropriate. BS 110 may iteratively repeat this cycle for each subsequent communication, thereby adaptively performing DL link adaptation to respond to potentially changing channel conditions.

According to various embodiments of the disclosure, MS 106 may determine a mode recommendation based on the condition of the communication channel. MS 106 may determine various channel information that indicates the condition of the communication channel. For example, MS 106 may generate PCINR prior to MIMO decoding and ECINR after MIMO decoding. As previously noted, because ECINR is determined after MIMO decoding while PCINR is not, ECINR may be a more accurate measure of the channel condition. MS 106 may make a mode recommendation based on the channel condition indicated by the determined ECINR. In other words, MS 106 may determine a mode configuration that MS 106 determines is appropriate in light of the determined ECINR. MS 106 may include at least a portion of the channel information, including PCINR, and the mode recommendation into Feedback 103a, Feedback 103b, . . . , Feedback 103n (hereinafter "Feedback 103" for convenience) and may provide Feedback 103 to BS 110.

According to various embodiments of the disclosure, BS 110 may generate a BS-derived mode configuration based on Feedback 103 received from MS 106 and/or other information such as system level information. As previously noted, Feedback 103 may include channel information that may indicate the channel condition of the communication channel. In particular, BS 110 may generate the BS-derived mode configuration using, for example, PCINR determined by MS 106 prior to MIMO decoding by MS 106.

Thus, according to various embodiments of the disclosure, BS 110 may receive a MS 106 mode recommendation from MS 106 and may determine a BS-derived mode configuration using channel information received from MS 106.

According to various embodiments of the disclosure, BS 110 may determine a tuned mode configuration by tuning the MS 106 mode recommendation and the BS-derived mode configuration. Tuning the BS-derived mode configuration and MS 106 mode recommendation may include using both in order to determine the tuned mode configuration. As a simplistic tuning example, BS 110 may tune a MS 106 mode recommendation that includes high MCS level and a BS-derived mode configuration that includes low MCS level to determine a tuned mode configuration that includes medium MCS level.

According to various embodiments of the disclosure, BS 110 may perform a hybrid scheme of DL link adaptation by determining whether to use the MS 106 mode recommendation, whether to use the BS-derived mode configuration, and/ or whether to generate a tuned mode configuration, thereby employing a hybrid scheme that uses the benefits of each. According to various embodiments of the disclosure, BS 11.0 may make this determination based on, for example, a mode gap. The mode gap may indicate a difference between the MS 106 mode recommendation and the BS-derived mode configuration. If a threshold mode gap difference is exceeded, then BS 110 may determine that using the tuned mode configuration is appropriate. In other words, if the MS 106 mode recommendation is sufficiently different (as defined by the threshold mode gap difference) from the BS-derived mode configuration, then the two may be tuned to generate a tuned mode configuration. The MS 106 mode recommendation and the BS-derived mode configuration may be different because MS 106 and BS 110 disagree on the channel condition. If such disagreement is sufficiently high, then confidence that either is correct may be reduced. Thus, selecting one or the other may result in a selection of an inappropriate mode configuration because MS 106, BS 110, or both may be incorrect when determining the channel condition. By tuning the MS 106 mode recommendation and the BS-derived mode configuration in these or other instances, BS 110 may address the effects of MS 106, BS 110, or both being incorrect when determining the channel condition and corresponding mode configuration to be used.

Figure 2:
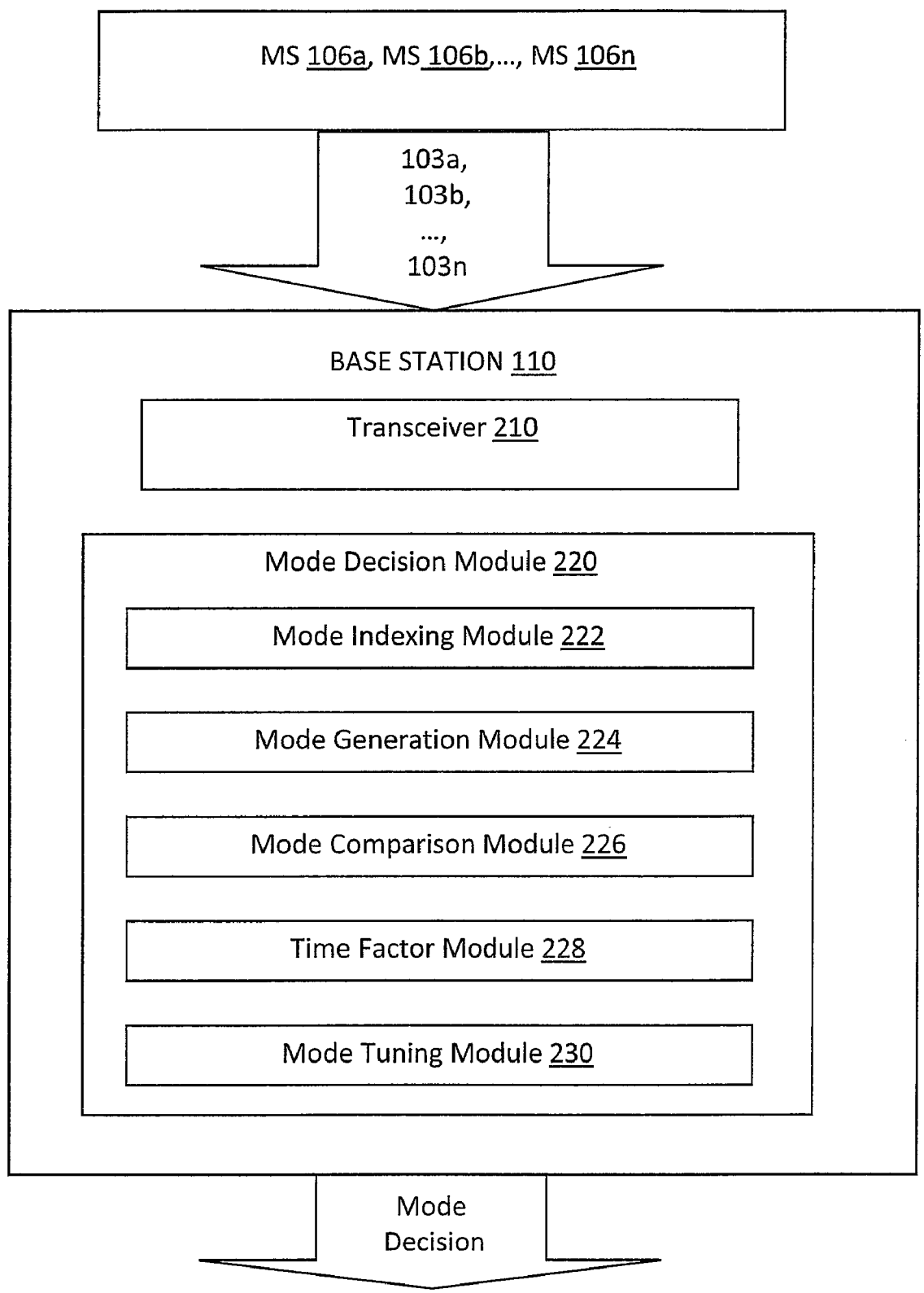
FIG. 2 is a block diagram that illustrates an example of a base station that is communicably coupled to a mobile station and that implements a hybrid scheme for DL link adaptation according to an embodiment of the disclosure.

FIG. 2 is a block diagram that illustrates an example BS 110, communicably coupled to MS 106, that implements a hybrid scheme for DL link adaptation according to an embodiment of the disclosure. BS 110 may include, among other things, transceiver 210 and mode decision module 220. Transceiver 210 may transmit to and receive communications from MS 106 on one or more communication channels. For example, transceiver 210 may receive Feedback 103 from MS 106 and transmit to MS 106 various communications on the one or more communication channels using a mode configuration determined by mode decision module 220.

According to various embodiments of the disclosure, through various modules, mode decision module 220 may employ hybrid schemes of DL link adaptation. For example, mode decision module 220 may include, among other things, mode indexing module 222, mode generation module 224, mode comparison module 226, time factor module 228, and mode tuning module 230. By employing hybrid schemes of DL link adaptation, mode decision module 220 may take advantage of the benefits of using an MS 106 mode recommendation, the benefits of using a BS-derived mode configuration, and the benefits of using a tuned mode configuration.

According to various embodiments of the disclosure, mode decision module 220 may index various mode configurations to be used. For example, mode indexing module 222 may associate a mode index for each level of MCS encoding. Table 1 below illustrates an example of such mode indices.

TABLE 1

| Mode index | Mode Configuration |
|---|---|
| 1 | QPSK 1/2, 6X |
| 2 | QPSK 1/2, 4X |
| 3 | QPSK 1/2, 2X |
| 4 | QPSK 1/2, 1X |
| 5 | QPSK 3/4 |
| 6 | 16-QAM 1/2 |
| 7 | 16-QAM 3/4 |
| 8 | 64-QAM 1/2 |
| 9 | 64-QAM 2/3 |
| 10 | 64-QAM 3/4 |
| 11 | 64-QAM 5/6 |

As would be appreciated, Table 1 may include other mode configurations associated with respective mode indices. Furthermore, although Table 1 illustrates mode indices as integers and mode configurations using example MCS levels, mode indices may include any other number, value, character, etc. suitable to be associated with mode configurations while the illustrated mode configurations may include others, such as MIMO encodings.

According to various embodiments of the disclosure, mode generation module 224 may use Feedback 103 received from MS 106 via transceiver 210 to determine a BS-derived mode configuration. In particular, PCINR included in Feedback 103 may be used to determine the BS-derived mode configuration. For example, when PCINR is low, mode generation module 224 may generate a low BS-derived mode configuration such as QPSK. When PCINR is high, mode generation module may generate a high BS-derived mode configuration such as 64-QAM. In particular, mode generation module 224 may assign "QPSK 3/4" when PCINR is 8 dB and assign "64-QAM 2/3" when PCINR is 27 dB.

According to various embodiments of the disclosure, mode comparison module 226 may compare the MS 106 mode recommendation with the BS-derived mode configuration generated by mode generation module 224. By using the comparison, mode comparison module 226 may generate a mode gap between MS 106 mode recommendation and the BS-derived mode configuration. As previously noted, when the mode gap exceeds the threshold mode gap difference, confidence in either or both of the MS 106 mode recommendation and the BS-derived mode recommendation may be reduced. In such cases, mode decision module 220 may determine to tune the MS 106 mode recommendation and the BS-derived mode configuration to generate the tuned mode configuration.

According to various embodiments of the disclosure, mode comparison module 226 may generate the mode gap by determining a difference between the MS 106 mode recommendation and the BS-derived mode configuration. To determine the difference, mode comparison module 226 may identify mode indices corresponding to the MS 106 mode recommendation and the BS-derived mode configuration. For example, referring to Table 1, if the MS 106 mode recommendation is MCS scheme "QPSK 1/2, 1×" and the BS-derived mode configuration is MCS scheme "16-QAM 3/4" then mode comparison module 226 may identify mode indices 4 and 7, respectively. Mode comparison module 226 may determine the difference using the identified indices by using the following example equation (1).

$$|\delta| = ID_{MS} - ID_{BS} \qquad (1)$$

where:

$|\delta|$ denotes the mode gap, $ID_{MS}$ denotes an index corresponding to the MS 106 mode recommendation, and $ID_{BS}$ denotes an index corresponding to the BS-derived mode configuration.

In the foregoing example, mode comparison module 224 may determine the mode gap (i.e., the aforementioned difference) is $|4-7|=3$. As previously noted, the determined mode gap may be compared to the threshold mode gap difference such that if the mode gap exceeds the threshold mode gap difference, then mode decision module 220 may decide to determine a tuned mode configuration. The threshold mode gap difference may be predefined by a vendor (or other entity), thereby providing flexibility to the vendor to define the level of difference between the MS 106 mode recommendation and BS-derived mode configuration that will cause mode decision module 220 to determine a tuned mode configuration. For example, if the vendor specifies that the threshold mode gap difference is 2, then in the foregoing example, mode decision module 220 may decide to tune the MS 106 mode recommendation and the BS-derived mode configuration (because the determined mode gap, 3, is greater than the threshold mode gap difference, 2).

On the other hand, when the mode gap does not exceed the threshold mode gap difference, mode decision module 220 may decide to use either the MS 106 mode recommendation or the BS-derived mode configuration depending on a predefined selection parameter provided by the vendor. The predefined selection parameter may define whether to use the MS 106 mode recommendation or the BS-derived mode configuration. In other words, the vendor may specify that the MS 106 mode recommendation is to be used when mode decision module 220 does not generate a tuned mode configuration. Alternatively, the vendor may specify that the BS-derived mode configuration is to be used when mode decision module 220 does not generate a tuned mode configuration, thereby providing to the vendor with an ability to specify whether to use a mode configuration based on MS 106 or BS 110 when the mode configurations are not tuned. Although the threshold mode gap difference is illustrated as an upper limit beyond which mode decision module 220 determines that a tuned mode configuration is to be generated, the threshold mode gap difference may be a lower limit as appropriate.

According to various embodiments of the disclosure, mode decision module 220 may use time factor module 228 to generate and/or retrieve a time factor that may be used to determine when to employ a hybrid scheme of DL link adaptation. Temporary and/or sudden changes to the channel condition may result in fluctuating mode configuration recommendations by both MS 106 and BS 110.

According to various embodiments of the disclosure, the time factor may be used to determine when to employ the hybrid scheme so that such temporary changes do not affect DL link adaptation described herein. The time factor, which may be expressed using, for example, a number of frames and/or any unit of time, may specify the number of frames and/or amount of time that elapses before considering whether to employ a hybrid scheme for DL link adaptation. For example, the time factor may specify that mode decision module 220 is to perform the hybrid scheme every 3 frames so that changes to the channel condition in intervening frames are not considered. Thus, mode decision module 220 may tolerate temporary and sudden changes to the channel condition, for example, when employing a hybrid scheme for DL link adaptation. Whether to use the time factor may be configured by the vendor. For example, the vendor may choose to toggle on or off the use of the time factor such that when off, each frame may be considered when employing the hybrid scheme.

According to various embodiments of the disclosure, the time factor may be used to generate an average of MS 106 mode recommendations and an average of BS-derived mode configurations that span the time factor. In this manner, mode decision module 220 may compare the average of MS 106 mode recommendations and the average of the BS-derived mode recommendations when determining the mode gap. Thus, the mode gap may be averaged for the time (i.e., number of frames and/or units of time) indicated by the time factor.

As previously noted, the time factor may be determined by time factor module 228 based on channel stability and/or be configured by the vendor (i.e., the vendor may specify the time factor to be 3). Time factor module 228 may use an indication of channel stability to determine the time factor. The channel stability may be indicated by, for example, Standard Deviation (e.g., of PCINR) reported by MS 106 via REP-REQ/RSP as is generally known. Increasing Standard Deviation may indicate increasing channel instability. As the channel instability increases, the time factor may decrease, which results in performing the hybrid scheme for DL Link adaptation more often and/or over a smaller period of time. In other words, time factor module 228 may determine the time factor, for example, as a linear function of channel instability identified by Standard Deviation.

It should be understood that the foregoing threshold mode gap differences and time factors are examples and should not be viewed as limiting in any way.

According to various embodiments of the disclosure, mode tuning module 230 may tune the MS 106 mode recommendation and the BS-derived mode configuration when a decision is made to determine a tuned mode configuration (i.e., when the mode gap exceeds the threshold mode gap difference and/or the time factor has been satisfied). For example, mode tuning module 230 may use the indices corresponding to the MS 106 mode recommendation and the BS-derived mode configuration according to example equation (2), described below.

$$ID_{TUNED} = \max(ID_{MS}, ID_{BS}) - (|\delta|/m) \qquad (2)$$

where:

$ID_{TUNED}$ denotes the mode index for the tuned mode configuration;

$\max(ID_{MS}, ID_{BS})$ denotes the greater of the index corresponding to the MS 106 mode recommendation and the index corresponding to the BS-derived mode configuration;

$|\delta|$ denotes the absolute value of the mode gap; and m denotes the threshold mode gap difference.

According to the example illustrated by equation (2), mode tuning module 230 may tune the MS mode recommendation and the BS-derived mode configuration using their respective mode indices, the mode gap indicated by a difference between the mode indices, and the threshold mode gap difference that may be predefined by the vendor. In a particular example where the mode index corresponding to the MS 106 mode recommendation is 4, the mode index corresponding to the BS-derived mode configuration is 7, and the threshold mode gap difference is 2, mode tuning module 230 may determine that the mode index corresponding to the tuned mode configuration (hereinafter tuned mode index for convenience) is 7−(|4−7|/2), or 7−3/2, or 5.5. Referring to Table 1, when the mode indices illustrated by Table 1 are integers and the determined mode index corresponding to the tuned mode configuration is a fraction, the tuned mode index may be rounded up or down as appropriate. Alternatively or additionally, intermediate variables (such as "3/2" in the foregoing example) used to generate the tuned mode index may be rounded up or down as appropriate. Thus, in the foregoing example, the tuned mode index may be rounded to 6. Referring to Table 1, for example, tuned mode index 6 corresponds to tuned mode configuration that includes MCS "16-QAM 1/2." This example illustrates that mode tuning module 230 may tune MS 106 recommendation that includes MCS "QPSK 1/2, 1×" (having a mode index of 4) and BS-derived mode configuration including MCS scheme "16-QAM 3/4" (having a mode index of 7) to a tuned mode configuration including MCS scheme "16-QAM 1/2" (having a tuned mode index of 6). In this manner mode tuning module 130 may be used to generate a tuned mode configuration when the MS 106 mode recommendation and the BS-derived mode configuration are not in agreement or otherwise when a tuned mode configuration is to be generated. It should be understood that example equation (2) should not be viewed as limiting. For example, the MS 106 mode recommendation and the BS-derived mode configuration may be tuned in other ways, such as for example, by averaging the corresponding mode indices, by assigning a greater weight to one or the other (thereby skewing the tuned mode configuration towards one or the other), and other methods by which the MS 106 mode recommendation and the BS-derived mode recommendation may be tuned so that both are considered when performing DL Link Adaptation.

In operation, mode decision module 220 may receive the MS 106 mode recommendation and the BS-derived mode configuration. Mode decision module 220 may determine whether to use the MS 106 mode recommendation, whether to use the BS-derived mode configuration, or whether to generate a tuned mode configuration. The determination may be based on a level of difference between the MS 106 mode recommendation and the BS-derived mode configuration identified by a mode gap. When the mode gap does not exceed a predefined threshold, mode decision module 220 may decide to use the MS 106 mode recommendation or the BS-derived mode configuration depending on vendor-defined preferences. When the mode gap exceeds the predefined threshold, mode decision module 220 may decide to generate a tuned mode configuration by tuning the MS 106 mode recommendation and the BS-derived mode configuration. The tuned mode configuration may address the effects of one or both the MS 106 mode recommendation and the BS-derived mode configuration being an inappropriate mode configuration for then-prevailing channel conditions. One or both may be an inappropriate mode configuration when, for example, the channel condition is challenging or otherwise difficult to assess. In this manner, by performing a hybrid scheme for DL link adaptation, mode decision module 220 may enable BS 110 to select a trusted mode configuration based on either the MS 106 mode recommendation or the BS-derived mode configuration when the channel condition is not challenging but also generate a tuned mode configuration when the channel condition is challenging.

Figure 3:
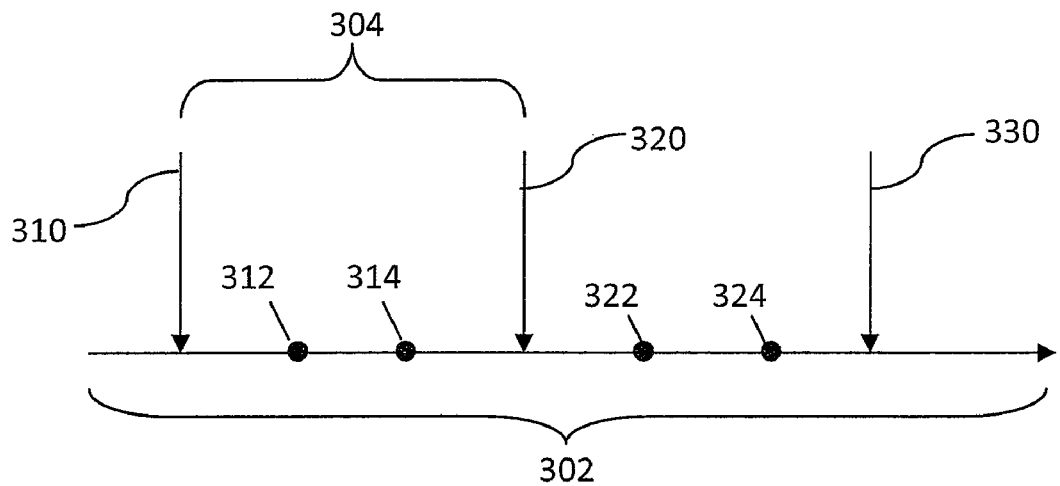
FIG. 3 is a one-dimensional graph illustrating a time factor to be used when determining whether to tune a mode configuration in a hybrid scheme for DL link adaptation according to an embodiment of the disclosure.

FIG. 3 is a one-dimensional graph 300 of time 302 illustrating a time factor 304 to be used when determining whether and when to employ a hybrid scheme for DL link adaptation according to an embodiment of the disclosure. Time 302 may be measured in number of frames, units of time, and/or other measure of time as appropriate. At time 310, 320, and 330, illustrated in graph 300 by arrows, mode decision module 220 employs the hybrid scheme.

According to various embodiments of the disclosure, at time 310, 320, and 330, mode decision module 220 may compare a MS 106 mode recommendation and a BS-derived mode configuration received at time 310, 320, and 330. Time factor 304 identifies a number of frames or amount of time before the hybrid scheme is employed. Thus, time factor 304 elapses between time 310 and 320 and between time 320 and 330. At time points 312, 314, 322, and 324, for example, time factor 304 has not been exceeded since the last time point where the hybrid scheme has been employed. As such, mode decision module 220 may decide not to implement the hybrid scheme at these time points.

According to various embodiments of the disclosure, at time 310, 320, and 330, mode decision module 220 may average MS 106 mode recommendations and BS-derived mode configurations received since a prior comparison of mode configurations. For example, at time 320, MS 106 mode recommendations received at time 312, 314, and 320 may be averaged with one another and BS-derived mode recommendations received at time 312, 314, and 320 may be averaged with one another. When comparing mode configurations, the averaged MS 106 mode recommendations may be compared to the averaged BS 110 mode configurations. In this manner, instead of comparing individual mode configurations, mode decision module 220 compare averaged mode configurations over a period of time (such as a period of time defined by time factor 304).

Figure 4:
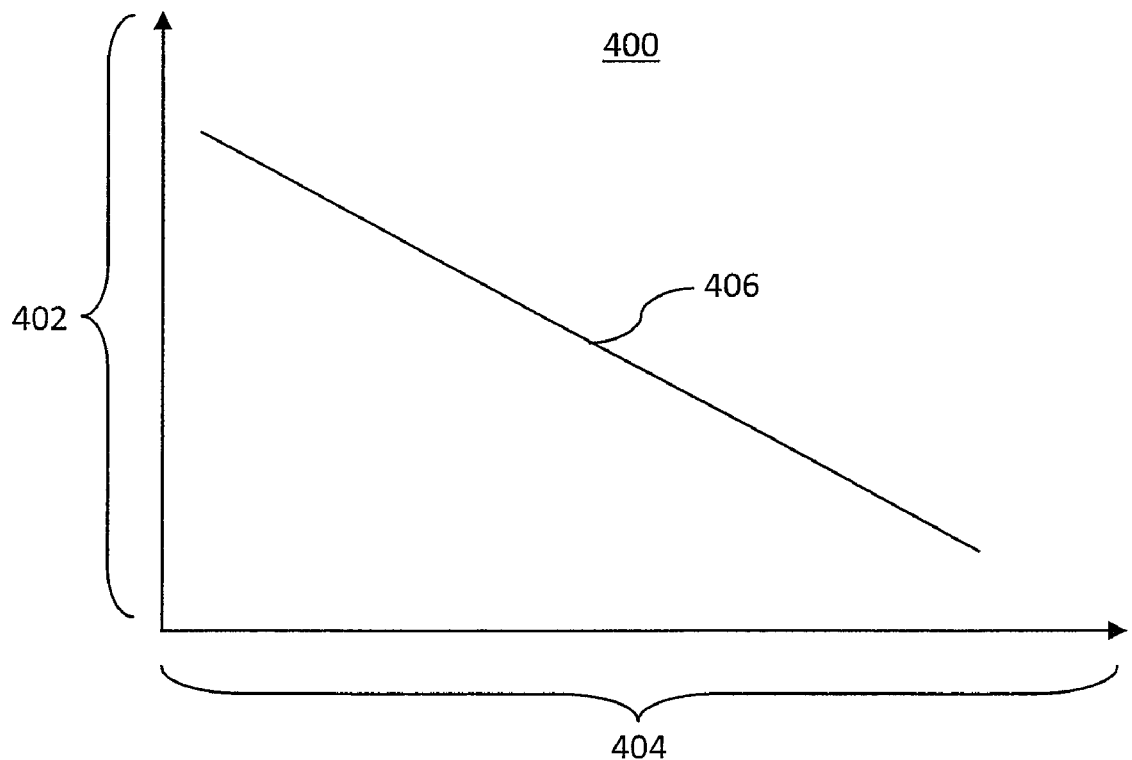
FIG. 4 is a two-dimensional graph illustrating a linear relationship between the time factor and channel stability according to an embodiment of the disclosure.

FIG. 4 is a two-dimensional graph 400 illustrating a linear relationship 406 between time factors 402 and channel stability 404 according to an embodiment of the disclosure. Channel stability 404 may be indicated by Standard Deviation. Mode decision module 220 may use linear relationship 406 when determining a time factor to be used. As illustrated by graph 400 and linear relationship 406, time factors 402 increase as channel stability decreases and time factors 402 decrease as channel stability increases. In other words, as the channel stability increases, a smaller time factor may be selected.

Figure 5:
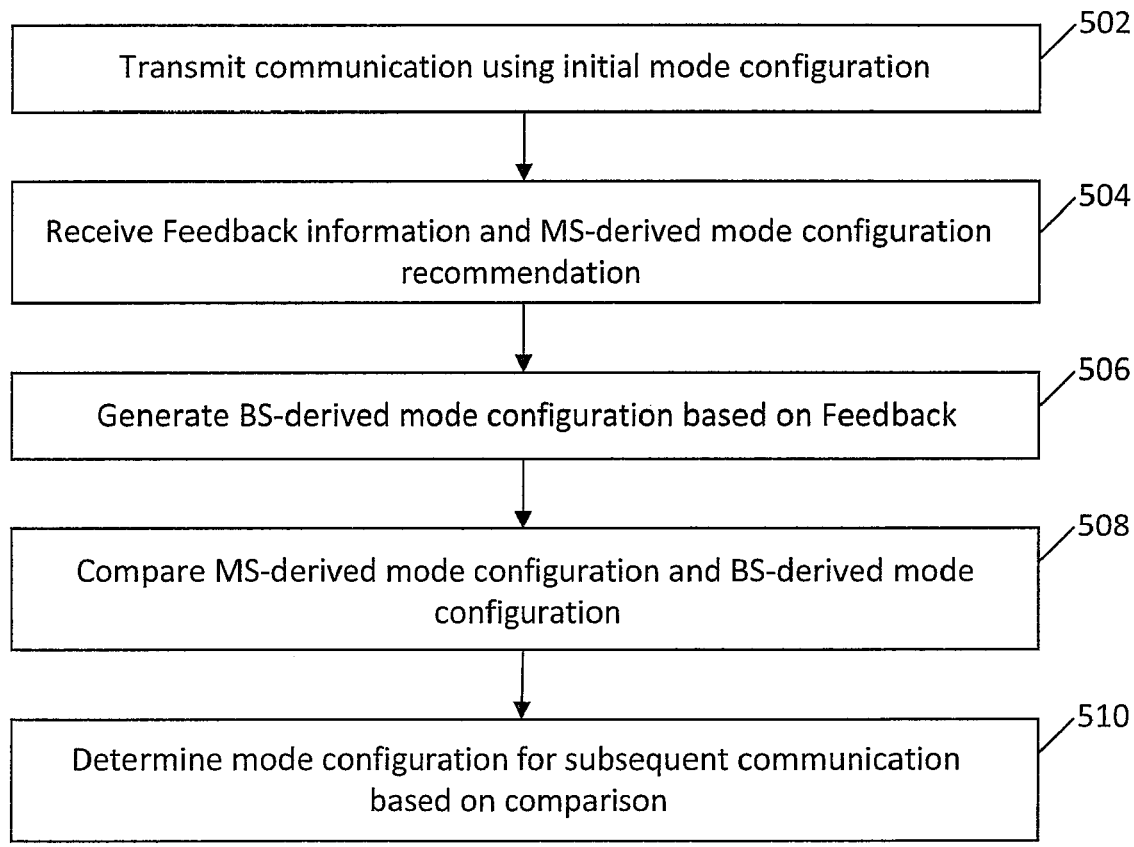
FIG. 5 is a flow diagram illustrating an example process for implementing a hybrid scheme for DL link adaptation according to an embodiment of the disclosure.

FIG. 5 is a flow diagram illustrating an example process 500 for implementing a hybrid scheme for DL link adaptation according to an embodiment of the disclosure. The various processing operations depicted in the flow diagram of FIG. 5 (and in the other drawing figures) are described in greater detail herein. The described operations for a flow diagram may be accomplished using some or all of the system components described in detail above and, in some embodiments, various operations may be performed in different sequences. In other embodiments, additional operations may be performed along with some or all of the operations shown in the depicted flow diagrams. In yet other embodiments, one or more operations may be performed simultaneously. Accordingly, the operations as illustrated (and described in greater detail below) are examples by nature and, as such, should not be viewed as limiting.

According to various embodiments of the disclosure, in an operation 502, BS 110 may transmit an initial communication to MS 106 using an initial mode configuration on a communication channel. In an operation 504, BS 110 may receive Feedback 103 from MS 106. Feedback 103 may include, among other things, information relating to the channel condition of the communication channel (such as, for example, PCINR and BuER) and the MS 106 mode recommendation, which is a mode configuration recommendation from MS 106 based on ECINR. In an operation 506, BS 110 may generate the BS-derived mode configuration using received Feedback 103. In particular, BS 110 may use PCINR from Feedback 103 provided by MS 106 in order to generate the BS-derived mode configuration. Because BS 110 and MS 106 may use different information when making a mode configuration recommendation, they may not be in agreement. As previously noted, MS 106 may generate the MS 106 mode recommendation based on ECINR generated after MIMO decoding while BS 110 may generate the BS-derived mode configuration based on PCINR generated prior to MIMO decoding. It may be unclear whether PCINR is more accurate than ECINR (and vice versa). In other words, it may be unclear whether the MS 106 mode recommendation or the BS-derived mode configuration should be used. Furthermore, when the MS 106 mode recommendation and the BS-derived mode configuration are different from one another, the channel condition may be considered challenging and difficult to assess. Thus, in an operation 508, BS 110 may compare the MS 106 mode recommendation with the BS-derived mode configuration.

Based on the comparison, in an operation 510, BS 110 may determine a mode configuration to use with subsequent communications.

Figure 6:
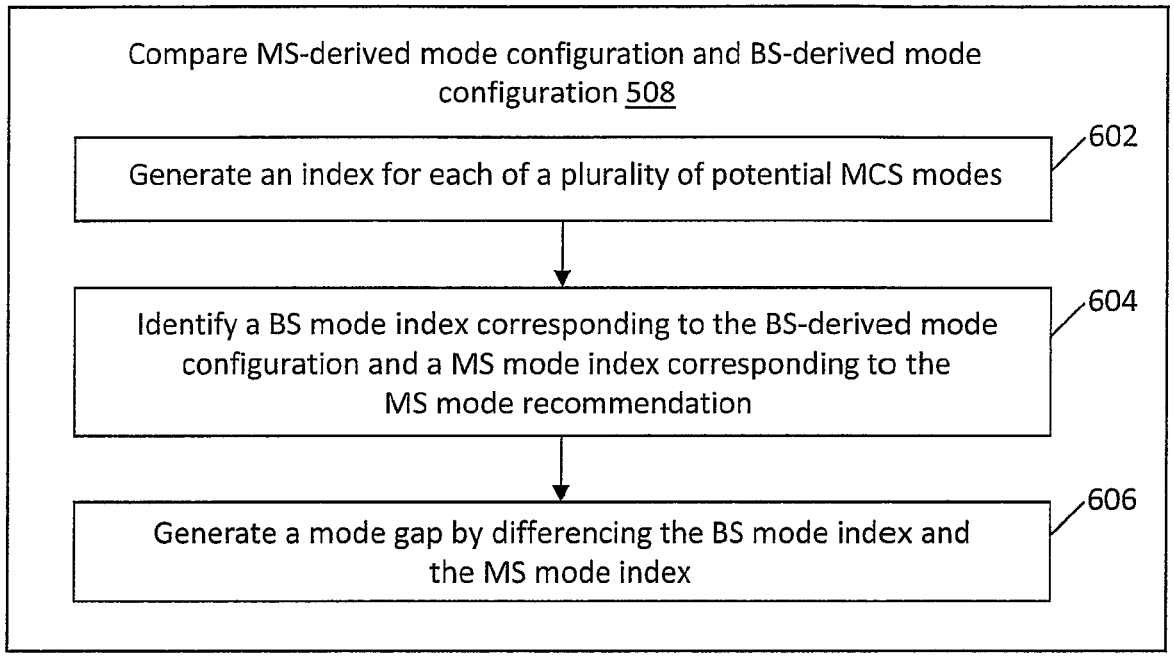
FIG. 6 is a flow diagram illustrating an example process for comparing a MS mode recommendation and a BS-derived mode configuration according to an embodiment of the disclosure.

FIG. 6 is a flow diagram illustrating an example process 508 for comparing a MS 106 mode recommendation and a BS-derived mode configuration and according to an embodiment of the disclosure. According to various embodiments of the disclosure, in an operation 602, BS 110 may generate a mode index for each of a plurality of mode configurations. In other words, potential mode configurations to be used for communicating with MS 106 on a communication may each be associated with a mode index. An example of such mode indices is illustrated in Table 1. A mode index may be identified based on the associated mode configuration and/or a mode configuration may be identified based on the associated mode index.

In an operation 604, when comparing the MS 106 mode recommendation with the BS-derived mode configuration, a MS mode index corresponding to the MS 106 mode recommendation and a BS mode index corresponding to the BS-derived mode configuration may be identified. For example, Table 1 may be used to lookup a corresponding index based on the MS 106 mode recommendation and the BS-derived mode configuration. In an operation 606, BS 110 may generate a mode gap, which indicates a level of difference between the MS 106 mode recommendation and the BS-derived mode configuration. BS 110 may generate the mode gap by differencing the MS mode index and the BS mode index, as illustrated in example equation (1). BS 110 may use the mode gap when determining a mode configuration for DL link adaptation.

Figure 7:
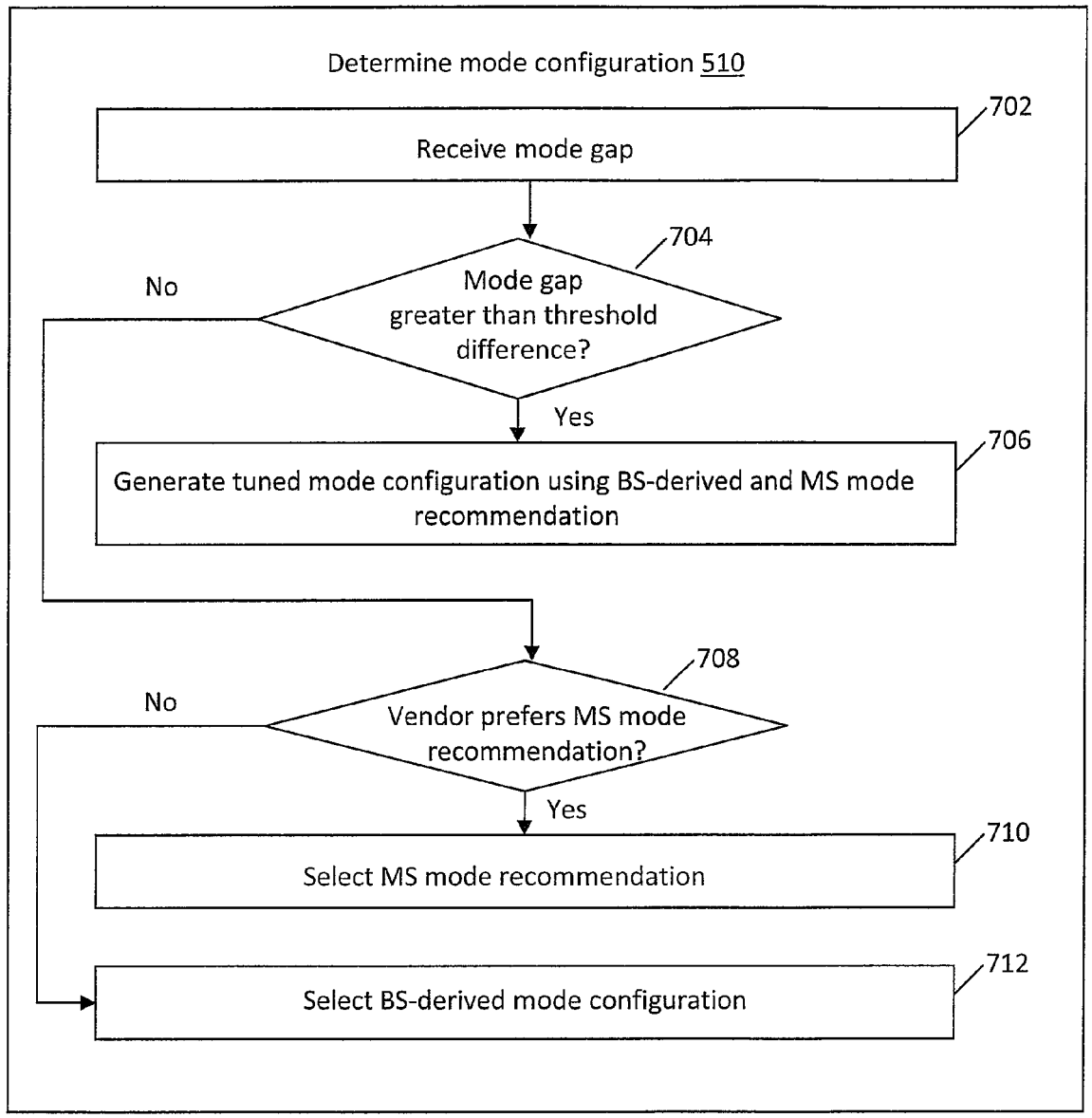
FIG. 7 is a flow diagram illustrating an example process 700 for determining a mode configuration based on a mode gap between a MS mode recommendation and a BS-derived mode configuration according to an embodiment of the disclosure.

FIG. 7 is a flow diagram illustrating an example process 510 for determining a mode configuration based on the mode gap between a MS 106 mode recommendation and a BS-derived mode configuration according to an embodiment of the disclosure. According to various embodiments of the disclosure, in an operation 702, BS 110 may receive or otherwise generate a mode gap. In an operation 704, the mode gap may be compared to a threshold mode gap difference. The threshold mode gap difference may be predefined by a vendor (or other entity), thereby providing flexibility to the vendor to define the level of difference between the MS 106 mode recommendation and BS-derived mode configuration that will cause mode decision module 220 to determine a tuned mode configuration. In an operation 704, if the mode gap exceeds the threshold mode gap difference, BS 110 may tune the MS 106 mode recommendation and the BS-derived mode configuration in an operation 706. BS 110 may generate the tuned mode recommendation by generating a tuned mode index based on the MS mode index and the BS mode index, which are described above with reference to FIG. 6. The tuned mode index may be generated by using, among other things, the example illustrated in Equation (2). The tuned mode index may then be used to lookup the tuned mode configuration using Table 1, for example.

Returning to operation 704, if the mode gap does not exceed the threshold mode gap difference, BS 110 may determine whether the MS 106 mode recommendation or the BS-derived mode configuration is to be used in an operation 708. For example, a vendor implementing the method may prefer to use either the MS 106 mode recommendation or the BS-derived mode configuration. If in operation 708, BS 110 determines that the vendor prefers the MS 106 mode recommendation, the MS 106 mode recommendation may be selected in an operation 710. On the other hand, if in operation 708, BS 110 determines that the vendor prefers the BS-derived mode configuration, the BS-derived mode configuration may be selected in an operation 712. It should be understood that a default predefinition may be used in addition to or instead of the vendor-supplied preference (e.g., the BS-derived mode configuration may be set as the default mode configuration to be used when BS 110 decides not to determine a tuned mode configuration).

Examples of MS 106 may include any one or more of, for instance, a personal computer, portable computer, personal digital assistant (PDA), workstation, web-enabled mobile phone, WAP device, web-to-voice device, or other device. Those having skill in the art will appreciate that the embodiments described herein may work with various system configurations. Furthermore, although MS 106 is illustrated in FIG. 1 as communicating with BS 110 via network 102, MS 106 may directly communicate with BS 110, as would be appreciated by those having skill in the art.

In addition, various embodiments of the disclosure may be made in hardware, firmware, software, or any suitable combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable storage medium may include read only memory, random access memory, magnetic disk storage media, optical storage media, flash memory devices, and others. Further, firmware, software, routines, or instructions may be described herein in terms of specific example embodiments of the disclosure, and performing certain actions. However, it will be apparent that such descriptions are merely for convenience and that such actions in fact result from computing devices, processors, controllers, or other devices executing the firmware, software, routines, or instructions.

Various embodiments described herein are describe as including a particular feature, structure, or characteristic, but every aspect or embodiment may not necessarily include the particular feature, structure, or characteristic. Further, when a particular feature, structure, or characteristic is described in connection with an embodiment, it will be understood that such feature, structure, or characteristic may be included in connection with other embodiments, whether or not explicitly described. Thus, various changes and modifications may be made to the provided description without departing from the scope or spirit of the disclosure.

For example, although illustrated as part of BS 110, mode decision module 220 may be part of BS 110 or separate from BS 110 so long as BS 110 is associated with or otherwise accesses functions of mode decision module 220. Furthermore, transceiver 210 may be a separate receiver and transmitter (not shown) without departing from the scope of this disclosure.

Other embodiments, uses and features of the present disclosure will be apparent to those skilled in the art from consideration of the specification and practice of the inventive concepts disclosed herein. The specification and drawings should be considered exemplary only, and the scope of the disclosure is accordingly intended to be limited only by the following claims.

What is claimed is:

1. A system for a hybrid scheme of DL link adaptation in a network having a plurality of mobile stations (MSs) communicably coupled to a base station (BS), the system comprising:

a mode decision module associated with the base station, the mode decision module comprising one or more processors configured to:
  select a first mode configuration for use during transmission of a first communication from the base station;
  receive first feedback information associated with the first communication, the first feedback information comprising a first mode recommendation and first channel information;
  generate a BS-derived mode configuration based on the first channel information;
  compare the first mode recommendation and the BS-derived mode configuration;
  determine a second mode configuration based on the comparison; and
  configure a second communication using the second mode configuration,
  wherein the one or more processors of the mode decision module are further configured to:
  generate a mode gap based on the comparison, wherein the mode gap indicates a difference between the first mode recommendation and the BS-derived mode configuration;
  compare the mode gap against a threshold mode gap difference;
  when the mode gap exceeds the threshold mode gap difference, determine that the first mode recommendation and the BS-derived mode configuration is to be tuned to generate the second mode configuration.

2. The system of claim 1, wherein the first mode configuration comprises one or more of: a Multiple-Input-Multiple-Output (MIMO) Mode or a Modulation Coding Scheme (MCS) level.

3. The system of claim 1, wherein the one or more processors of the mode decision module are further configured to:
  determine that the first mode recommendation is to be used, wherein the first mode recommendation is selected to be used for the second mode configuration.

4. The system of claim 1, wherein the one or more processors of the mode decision module are further configured to:
  determine that the first mode recommendation is not to be used; and
  select the BS-derived mode configuration to be used for the second mode configuration.

5. The system of claim 1 wherein the one or more processors of the mode decision module are further configured to:
  tune the first mode recommendation and the BS-derived mode configuration to generate the second mode configuration using the results of the comparison.

6. The system of claim 5, wherein the one or more processors of the mode decision module are further configured to:
  generate an index for each of a plurality of mode configurations;
  assign a first index for the first mode recommendation;
  assign a second index for the BS-derived mode configuration,
  wherein said tune comprises:
    compare the first index with the second index;
    generate a third index based on the comparison; and
    determine a particular one of the plurality of mode configurations having an index that corresponds to the third index, wherein the particular one of the plurality of mode configurations is selected for the second mode configuration.

7. The system of claim 1, wherein the one or more processors of the mode decision module are further configured to:
  determine whether a time factor has been exceeded, wherein the time factor is a criteria for when to determine whether to tune the first mode recommendation and the BS-derived mode recommendation.

8. The system of claim 7, wherein the time factor is a predefined number of frames since a prior determination whether to perform said tune.

9. The system of claim 1, wherein the one or more processors of the mode decision module are further configured to:
  receive second feedback information comprising a second mode recommendation and second channel information;
  generate a second BS-derived mode configuration based on the second channel information;
  compare the second mode recommendation with the second BS-derived mode configuration;
  determine a third mode configuration based on the comparison; and
  configure a third communication using the third mode configuration.

10. The system of claim 1, wherein the network is a WIMAX network.

11. A mode decision device for a hybrid scheme of mode decision in a network having a plurality of mobile stations communicably coupled to a base station, the mode decision device comprising:
  one or more processors configured to:
    select a first mode configuration for use during transmission of a first communication from the base station;
    receive first feedback information associated with the first communication, the first feedback information comprising a first mode recommendation and first channel information;
    generate a BS-derived mode configuration based on the first channel information;
    compare the first mode recommendation and the BS-derived mode configuration;
    generate a mode gap based on the comparison, wherein the mode gap indicates a difference between the first mode recommendation and the BS-derived mode configuration;
    compare the mode gap against a threshold mode gap difference;
    when the mode gap exceeds the threshold mode gap difference, determine that the first mode recommendation and the BS-derived mode configuration is to be tuned to generate the second mode configuration; and
    configure a second communication using the second mode configuration.

12. A computer-implemented method for implementing a hybrid scheme of DL link adaptation in a network having a plurality of mobile stations (MSs) communicably coupled to a base station (BS), the method comprising:
  selecting, by one or more processors of a mode decision module associated with the base station, a first mode configuration for use during transmission of a first communication from the base station;
  receiving, by the one or more processors of the mode decision module, first feedback information associated with the first communication, the first feedback information comprising a first mode recommendation and first channel information;
  generating, by the one or more processors of the mode decision module, a BS-derived mode configuration based on the first channel information;

comparing, by the one or more processors of the mode decision module, the first mode recommendation and the BS-derived mode configuration;

determining, by the one or more processors of the mode decision module, a second mode configuration based on the comparison;

configuring, by the one or more processors of the mode decision module, a second communication using the second mode configuration; and generating, by the one or more processors of the mode decision module, a mode gap based on the comparison, wherein the mode gap indicates a difference between the first mode recommendation and the BS-derived mode configuration;

comparing, by the one or more processors of the mode decision module, the mode gap against a threshold mode gap difference;

when the mode gap exceeds the threshold mode gap difference, determining, by the one or more processors of the mode decision module, that the first mode recommendation and the BS-derived mode configuration is to be tuned to generate the second mode configuration.

13. The method of claim 12, wherein the first mode configuration comprises one or more of: a Multiple-Input-Multiple-Output (MIMO) Mode or a Modulation Coding Scheme (MCS) level.

14. The method of claim 12, the further comprising:
determining, by the one or more processors of the mode decision module, that the first mode recommendation is to be used, wherein the first mode recommendation is selected to be used for the second mode configuration.

15. The method of claim 12, the method further comprising determining, by the one or more processors of the mode decision module, that the first mode recommendation is not to be used; and selecting, by the one or more processors of the mode decision module, the BS-derived mode configuration to be used for the second mode configuration.

16. The method of claim 12, the method further comprising:
tuning, by the one or more processors of the mode decision module, the first mode recommendation and the BS-derived mode configuration to generate the second mode configuration using the results of the comparison.

17. The method of claim 16, the method further comprising:
generating, by the one or more processors of the mode decision module, an index for each of a plurality of mode configurations;

assigning, by the one or more processors of the mode decision module, a first index for the first mode recommendation;

assigning, by the one or more processors of the mode decision module, a second index for the BS-derived mode configuration, wherein said tuning further comprises:
comparing, by the one or more processors of the mode decision module, the first index with the second index;

generating, by the one or more processors of the mode decision module, a third index based on the comparison; and determining, by the one or more processors of the mode decision module, a particular one of the plurality of mode configurations having an index that corresponds to the third index, wherein the particular one of the plurality of mode configurations is selected for the second mode configuration.

18. The method of claim 12, the method further comprising:
determining, by the one or more processors of the mode decision module, whether a time factor has been exceeded, wherein the time factor is a criteria for when to determine whether to tune the first mode recommendation and the BS-derived mode recommendation.

19. The method of claim 18, wherein the time factor is a predefined number of frames since a prior determination whether to perform said tune.

20. The method of claim 12, the method further comprising:
receiving, by the one or more processors of the mode decision module, second feedback information comprising a second mode recommendation and second channel information;

generating, by the one or more processors of the mode decision module, a second BS-derived mode configuration based on the second channel information;

comparing, by the one or more processors of the mode decision module, the second mode recommendation with the second BS-derived mode configuration;

determining, by the one or more processors of the mode decision module, a third mode configuration based on the comparison; and configuring, by the one or more processors of the mode decision module, a third communication using the third mode configuration.

21. The method of claim 12, wherein the network is a WIMAX network.

22. A non-transitory computer-readable storage medium storing computer executable instructions for a hybrid scheme of DL link adaptation in a network having a plurality of mobile stations (MSs) communicably coupled to a base station (BS), the instructions, when executed, configuring one or more processors to perform the functions of:
selecting, by the BS, a first mode configuration for use during transmission of a first communication from the base station;

receiving, by the BS, first feedback information associated with the first communication, the first feedback information comprising a first mode recommendation and first channel information;

generating, by the BS, a BS-derived mode configuration based on the first channel information;

comparing, by the BS, the first mode recommendation and the BS-derived mode configuration;

generating a mode gap based on the comparison, wherein the mode gap indicates a difference between the first mode recommendation and the BS-derived mode configuration;

comparing the mode gap against a threshold mode gap difference;

responsive to the mode gap exceeding the threshold mode gap difference, determining that the first mode recommendation and the BS-derived mode configuration is to be tuned to generate the second mode configuration; and configuring, by the BS, a second communication using the second mode configuration.

* * * * *